United States Patent Office 3,019,037
Patented Jan. 30, 1962

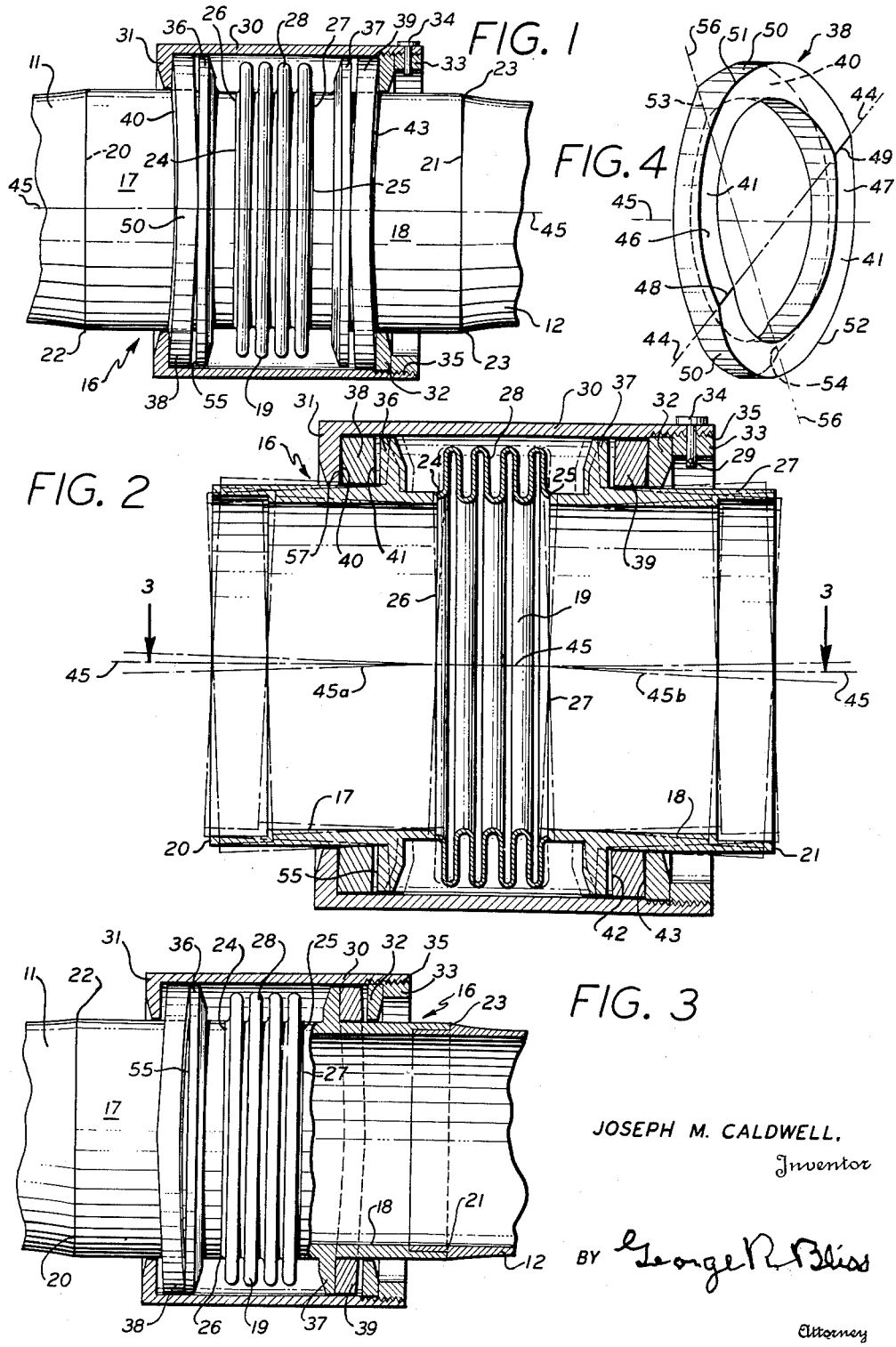

3,019,037
UNIVERSALLY FLEXIBLE CONDUIT JOINT
Joseph M. Caldwell, 8256 San Fernando Road,
Sun Valley, Calif.
Filed May 21, 1959, Ser. No. 814,768
3 Claims. (Cl. 285—226)

This invention relates to universally flexible joints in conduits, especially conduits of rigid material. It relates particularly to joints in conduits characterized by the presence of steel bellows-shaped, flexibly walled sections, each interposed between and connecting two rigidly walled sections of the conduit.

In this type of conduit connection, the two terminal folds of a thin-walled, corrugatedly shaped, open ended cylinder, commonly termed a "bellows," are integrally connected as by welding, with the terminal rims of two adjacently arranged conduit sections respectively. The ends of the bellows are collapsibly and divergently movable toward and away from each other to a slight extent, due to the thin flexible character of its walls. Such conduit sections are widely utilized in aircraft, missile systems, nuclear type apparatus, engine bleeding, airconditioning equipment, hydraulic control devices, and many other types of industrial installations.

They have two great advantages over other kinds of conduit connections. (1) Because of the integrality of the connection between the material of the bellows and that of the ends of two joined conduit sections, the walls of the conduits are rendered fluid tight without the use of a sealing means between separable surfaces; and (2) the undulating shape of the walls of the bellows permits the bending of the two joined conduit sections with respect to their axial directions at their connections, over a limited degree of angularity which may be as much as ten degrees or more of curvature.

Such a bellows type connecting joint may be of desirable installation at a station along the conduit whether at that station the path of the conduit is normally curved or normally straight. In either case the joint permits angular axial movement of one conduit section relative to the other arising from longitudinally directed thermally generated stresses, from installation misalinement, from relative movement of the structural elements of the installation to which the two joined lengths of the conduit are secured, whether that relative movement is of an axially torsional or of an axially flectional character or both.

While these bellows type connections have this twofold important advantage of permitting relative movement of the connected conduit sections and having no danger of fluid leak around or through a sealing means between two separable section ends, they must be safeguarded against the application of undue longitudinal tensile or flectional stresses to the bellows, because of the relatively weak, delicate structural character of the thin walls of the bellows, as the conduit sections are forcibly pulled apart from each other, flexed with respect to each other or axially twisted with respect to each other. To accomplish this purpose, several different types of socalled "restraining" means are provided in the known bellows type joint structures.

Such restraining means are essentially supplementary coupling means between the conduit ends which take the brunt of the stresses to which the joint is subjected but which cannot by their very nature afford a fluid tight connection. The bellows connection provides the joint with its perfect fluid tight character as only a bellows connection can do, and the restraining means prevents rupture or permanent distortion of the bellows walls.

The restraining means may be outside of the conduit chamber which is within the walls of the bellows and conduit ends, or it may be within this conduit chamber. Probably in most of the known types of restraining means, the internal arrangement of the restraining means is used. It may take the form of a tie rod mounted axially within the conduit and universally connected at its ends to the inner surfaces of the walls of the conduit ends. It may take the form of a gimbal ring, one element of the ring being rigidly secured to one of the conduit ends and the other element being rigidly secured to the other of the conduit ends, each ring element extending inwardly to the longitudinal center of the bellows where they are joined in the conventional gimbal ring manner. The gimbal ring principle may also be applied to a restraining means which encircles the bellows.

In this invention the restraining means takes the form of a sturdy sleeve mounted to encircle and enclose within its interior chamber the bellows and adjacent ends of the conduit sections and arranged to hold together the ends of the conduit sections, while at the same time permitting bending or twisting of the conduit ends relative to each other over a limited range of movement.

It is one object of the invention to provide an external restraining means for a bellows type conduit connecting joint which shall afford a minimum of pressure drop at the joint in the fluid flowing through the conduit. It is also an object of the invention to provide an external housing for the bellows which will protect it mechanically, and which shall minimize access of dirt or other foreign material or of destructive fluids to the outer surface of the bellows. It is still another object to provide a degree of temporary emergency protection of the environmental objects and equipment surrounding the joint from deleterious or destructive effects of leakage through the bellows of the fluid within the conduit in the event of a failure or fracture of the walls of the bellows. It is also an object of the invention to provide such a restraining means which shall be inexpensive to manufacture, readily assembled and applied, readily repaired or replaced and be possessed of maximum length of life, with a minimum probability of failure, while providing the bellows with maximum protection against the stresses to which it is subjected in use.

One embodiment of the invention is shown and described herein. It is not intended that the invention and its protection shall be limited to this specific embodiment. This embodiment is illustrative of the principles of the invention, the scope of which is to be limited only by the descriptive implications of the definitions of the invention presented in the appended claims.

In the drawings depicting this embodiment of the invention, FIGURE 1 is a side elevation of a portion of a conduit having a bellows type joint disclosing the invention, the restraining means being shown in section on a longitudinal central plane.

FIGURE 2 is a view of an enlarged scale of the joint separately from the conduit sections which it connects, and in a position similar to that of FIGURE 1, all of the parts of the joint being shown in vertical longitudinal section, the normal position of the parts being shown in full lines and other relative positions being shown in phantom lines.

FIGURE 3 is a view similar to FIGURE 1, with terminal portions of the joined conduit sections being shown in cross section, the section plane being displaced 90 degrees from the section plane of FIGURE 1, to better illustrate the structure and performance of the cam plate.

FIGURE 4 is a perspective view of one of the cam plates.

Referring to FIGURES 1, and 3, the two end portions 11 and 12 of adjacent conduit sections of a conduit are integrally joined by a bellows type flexible joint 16 of conventional construction. The joint 16 comprises two tubular terminal sections of conduits 17 and 18 and a bellows type connector. The outwardly directed rims 20 and 21 of the tubular conduit sections 17 and 18 are welded at their outer ends to the adjacent rims of the conduit end portions 11 and 12 at 22 and 23, respectively. The rims of the inner ends of the sections 17 and 18 are welded at 24 and 25 to the adjacent ends 26 and 27 respectively of the bellows connector 19, in the conventional manner, the material of which is a thin sheet of suitable flexible metallic material formed with a plurality of undulatory folds 28 as shown in the drawing.

A bellows type joint of the kind just described may be used in conduits, for example, on aircraft or air missiles for the flow of fluid for the operation of hydraulic equipment, for the flow of air or other gaseous material to pressurized compartments, or for the flow of combustible fluids to and from jet engines or engines of other types. Vibration of the airborne structure, excessive temperature and/or pressure range of the conducted fluids or ambient material or both, and the need for leakproof conditions at all points in the path of a conduit under all conditions of operation, have made necessary in many installations the provision of joints of the flexible bellows type.

Because the two requirements that the joint be leakproof and flexible, are both satisfied by the bellows type joint, this type of joint is widely used in the design of conduits mounted on airborne bodies. The principal problem in the design of this type of joints has been to assure the capability of the bellows connector to resist tensile, compressive and torsional stresses, since the very qualities in the connector which give it the required flexibility, i.e. its thinness and convoluted conformation lower its strength to resist tensile, compressive and torsional stresses.

In this invention the restraining means provided to thus strengthen the bellows connector is of the external type. It is shown in FIGURES 1 and 3 of the drawing, but is best illustrated in FIGURE 2. Its primary element is a sleeve 30, formed integrally with a radially inwardly extending flange 31 at one end of the sleeve. A separable flange 32 of similar shape to the flange 31 is disposed within the other end of the sleeve and longitudinally adjustably retained in position therein by a ring nut 33. This ring nut is externally threaded and engages the internally threaded bore 35 of the sleeve 30 and is locked against threaded rotation within the sleeve by a locking pin 34. This locking pin is preferably bored at its inner end at 29 for insertion of a cotter pin or wire (not shown) to prevent accidental removal of the locking pin. The ring flanges 31 and 32 are of an inside diameter slightly greater than the outside diameter of conduit sections 17 and 18 respectively.

The tubular sections 17 and 18 are integrally formed with radially outwardly extending ring flanges or collars 36 and 37 respectively, each rather snugly fitting diametrically within the bore surface of the sleeve 30, and spaced longitudinally inwardly from its associated flange 31 or 32 on the sleeve 30. A cam shaped ring or plate 38 is disposed between the face of the flange 36 which is axially inwardly proximate the ring 38, and the longitudinally inner lateral face 57 of the flange 31. Another cam ring 39 is similarly placed on the other side of the bellows connector 19 between flange 37 and separable flange 32.

Each of these rings 38 and 39 has an inside diameter slightly greater than the outside diameter of the conduit section 17 or 18 upon which it may move rotationally, and an outside diameter slightly less than the inside diameter of the sleeve 30, within which it may move rotationally. At any point of its circumference, the ring is rectangular in cross section in a plane embracing its central axis. (See FIG. 2.) Neither of the radially extending end surfaces 40 and 41 of ring 38, nor of the similarly radially extending end surfaces 42 and 43 of the ring 39 (FIG. 2) lies in a single plane. This is illustrated in FIGURE 4 which is a perspective view of ring 38. Rings 38 and 39 are identical in construction.

Referring to ring 39, shown in FIGURE 4, the axially facing end surface 41 is in two portions 46 and 47 which lie in two different planes, which intersect along a common imaginary diametrical line 44 to form a slightly obtuse angle of nearly 180 degrees. Both planes are at slight obtuse angles of equal magnitude and in opposite directions with respect to a plane perpendicular to the axis 45 of the conduit and joint structure. When the above stated geometrical conditions are present, the surface 41 has two slight ridges 48 and 49 along the line of intersection of its two surface portions 46 and 47; these ridges are in the same straight line and divide the surface 41 into the two 180 degree sector portions 46 and 47. The two portions of surface 41, i.e. the sectors 46 and 47, each lie in its own single plane which intersects the cylindrical rim surface 50 of the cam ring 38 to provide curved contour lines 51 and 52 respectively, of approximately circular but very slightly ellipsoidal shape.

The other end surface 40 of the ring 38 is formed similarly to the end surface 41. Ridges 48 and 49 however must be displaced 90 degrees with respect to ridges 53 and 54. Normally the axes of conduit sections 17 and 18 are in one straight line. If these axes assume an abnormal position relative to each other in which one axis forms an obtuse angle of nearly 180 degrees with the other, due to a buckling movement of the conduit as a result of mechanical vibration, thermal expansion, application of a compressive force, or a flexing stress, then the several parts of the joint may be subject to dislocation, first in one direction and then in the other, such as is illustrated in FIGURE 2 in dot and dash lines.

For example, the flat planar axially outer surface 55 of flange 36, formed integrally on conduit end section 17 may rock on the axis 49 away from portion 46 of the surface 41 on the cam ring 38 toward portion 47 of that ring surface, and vice versa, thereby permitting the flange 36 to oscillate about axis 49. At the same time, the cam ring 38 and flange 36 which are held tightly together at ridges 48 and 49 by the clamping action of the flanges 31 and 32 and the resilience of the bellows connector 19, may rock as one assembly about axis 56 of ridges 53 and 54, which are pressed against the inwardly facing radial surface 57 of flange 31 (FIG. 2). The axes 49 and 56 are displaced 90 degrees relative to each other. The result of this construction at both ends of the flexible conduit joint is that the axial displacement of the axes 45a and 45b (FIGURE 2) of the jointed conduit sections 17 and 18 may be universally accommodated within the restraining cylinder sleeve 30 to a limited degree by the bellows connector 19, while the sleeve 30 is inhibiting the action of destructive stresses upon the bellows connector.

The cross sectional area of the flow chamber of the conduit is unobstructed and unrestricted throughout the length of the joint, with the result that there is no pressure drop at the joint, and no part of the structure of the conduit and joint projects into the flow stream of the fluid in the conduit. The sleeve 30 protects the bellows from mechanical injury. The cylindrical middle portion of the sleeve and the end flanges 31 and 32 protect the bellows connector and adjacent parts such as the cam plates 38 and 39 from the destructive and obstructive action of dirt or other foreign material. It is also to be noted that the sleeve 30 and its end flanges 31 and 32 which fit snugly down upon the walls of the terminal sections of the conduit will provide temporary emergency protection of objects and bodies and operating personnel which may be externally adjacent the conduit joint, from the streams of rushing high pressure fluid which would escape from the conduit joint in the event of a failure or fracture of the walls of the bellows 19, beore the fluid flow could be shut off.

The bellows undulations 28, except for their fluid sealing action, perform very much like a coiled spring welded at its ends to the ends of the adjacent conduit sections. If the stresses acting upon the two sections are in axial alinement with the conduit axes, they will act as a connector between the two terminal sections to hold the sleeve flanges 31 and 32, collar flanges 36 and 37, cam rings 38 and 39 in practically longitudinally immovable relation, and thereby tie the two terminal sections thus immovably together. Any slight relative movement of the two terminal conduit sections 17 and 18 toward or away from each other is immediately compensated by the resilient action of the bellows' undulations which returns them to their original position without appreciable lengthening or shortening of the conduit. When, now, the stresses are such that the relative movement throws the terminal sections alternately out of axial alinement first in one angular direction and then in the opposite direction, and if the rings 38 and 39 were shaped with parallel flat faces perpendicular to their axes, the center points of the collar flanges 36 and 37 would be pushed away from and back against the center points of their adjacent rings 38 and 39 respectively, in two successive movements, one for each alternation, and the bellows connector would be twice shortened and restored to its original length. The conduit as a whole would be shortened and lengthened correspondingly, an event which would have a destructive effect on the bellows and also in most installations on the conduit and conduit mountings as well as on the parts of the restraining means. If no rings were interposed between the sleeve flanges and the conduit flanges, the interaction of the conduit terminals would still be defective. If resilient material were used in the rings 38 and 39, their life would be short in the presence of fluids of a character to destructively affect the material of the rings, and also any resilient material would be less resistant to the constantly alternating stresses than would a non-resilient rigid material.

By shaping the surfaces of the rings 38 and 39 as shown and described, an angular misalignment in any direction does not cause the flanges 31 and 32 to push together the center points of the conduit collars 36 and 37. Consequently the bellows connector maintains a constant length between the center points of its undulations, thereby minimizing the amplitude of the axial movement of the rim of each undulation.

I claim:

1. In a conduit joint structure for joining the confronting ends of adjoining lengths of a conduit, the combination of: a pair of conduit sections joined in a fluid tight manner to the terminals of said lengths of conduit at their confronting ends respectively; a bellows type connector between and joined in fluid tight relationship to said conduit sections at their other two ends; a pair of annular flanges rigidly secured to the conduit sections respectively, one on each side of the connector, and each having an annular plane surface extending outwardly from the wall of the conduit section and facing away from the connector; a cylindrical shell disposed longitudinally of the joint wholly outside said flanges and connector and having at its ends annular flanges surrounding said conduit sections, each shell flange having an annular plane surface extending inwardly of the cylindrical shell and facing toward the connector and disposed in opposed relation to said annular plane surface of the confronting conduit flange, a pair of rings, one being disposed about each of said conduit sections in the region at opposite ends of the joint structure between the opposed plane surfaces of the conduit flanges and the shell flanges respectively, each of said rings having on at least one face a pair of diametrically opposed axially extending protuberances which provide for rocking line contact between at least said one face and the confronting plane face of one of said flanges, the flanged shell being so constructed and arranged as to rigidly retain said rings against movement away from each other, whereby said rings function as axial extensions of the shell flanges to accommodate angular displacement of the conduit sections.

2. The combination defined in claim 1 in which one of said shell flanges is longitudinally axially adjustable as to its rigid connection to the shell.

3. The combination defined in claim 1, wherein the pair of rings includes a first cam ring disposed longitudinally snugly between one of said shell flanges and the associated conduit flange, said cam ring being of rectangular cross section and shaped to have its axially inwardly directed radial lateral surface lying in two different planes which intersect on a diameter of the said surface at a first small obtuse angle relative to each other, which is bisected by a plane through the said diameter which is perpendicular to the axis of the cam ring, and further shaped to have its axially outwardly directed radial lateral surface lying in two different planes which intersect on a diameter of the said surface at a second small obtuse angle relative to each other similar to the said first obtuse angle, and similarly bisected, the latter diameter being displaced ninety degrees from the former diameter around the axis of the cam ring; and also in addition thereto a second cam ring similarly shaped to the first cam ring and similarly related to the other said shell flange and its associated conduit flange.

References Cited in the file of this patent

UNITED STATES PATENTS

| 813,714 | Ketcham | Feb. 27, 1906 |
| 1,595,942 | Jacobs | Aug. 10, 1926 |
| 2,713,503 | Ekholm | July 19, 1955 |

FOREIGN PATENTS

| 629,717 | Germany | Feb. 4, 1934 |